*M. Roberts,*
*Cutter Head,*
Nº 14,899.          Patented May 13, 1856.
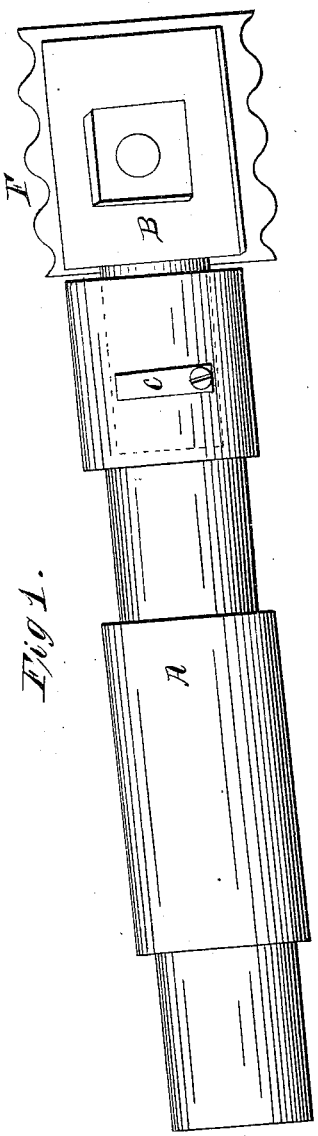
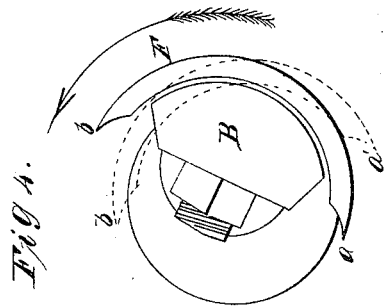
Fig 4.
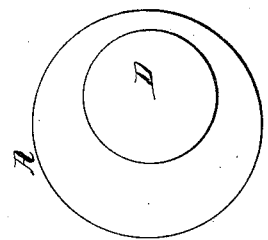
Fig 3.
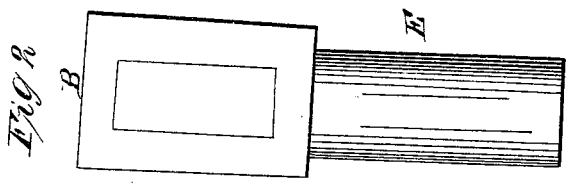
Fig 2.

UNITED STATES PATENT OFFICE.

MILTON ROBERTS, OF BELFAST, MAINE, ASSIGNOR TO MILTON ROBERTS AND ISAAC N. FELCH.

CUTTER-HEAD FOR LATHES.

Specification of Letters Patent No. 14,899, dated May 13, 1856.

*To all whom it may concern:*

Be it known that I, MILTON ROBERTS, of Belfast, in the county of Waldo and State of Maine, have invented a new and useful Improvement in Machines for Cutting Irregular Forms, of which the following is a full and exact description.

This invention consists in the mandrel A, Figure 1, with the cutter head B, inserted in the mandrel A, out of center as represented in D, Fig. 3, in the annexed drawings which form a part of this specification.

In order to cut with the grain of the wood the mandrel A, Fig. 1, is reversed in motion, which throws out the edge *a* of cutter F, to *a'* as seen in Fig. 4; and vice versa *b'* to *b*. In the mandrel A, Fig. 1, is a slat C, with a pin in the tenant E, of the cutter head B, so as to prevent the cutter head from vibrating more than the required distance.

The form of the out side of the cutter is the reverse of the pattern required and the edge is the salient angle arrangement to produce a draw cut.

What I claim as my invention and desire to have secured by Letters Patent is—

The eccentric insertion of the tenant E, of the cutter head B, in the mandrel A, as represented in Fig. 3, to produce an eccentric motion in throwing out the edge of the cutter and performing as set forth in the specification.

In witness whereof, I have hereunto subscribed my name the 28 day of March, A. D., 1856.

MILTON ROBERTS. [L. S.]

In presence of—
W. H. HOUSTON,
I. A. LEWIS.